(12) United States Patent
Koch et al.

(10) Patent No.: US 7,331,367 B2
(45) Date of Patent: Feb. 19, 2008

(54) MONITORING DEVICE AND PATCH ASSEMBLY

(75) Inventors: Russell W. Koch, Hartville, OH (US); David A. Przygocki, Longmont, CO (US); Robert John Sears, Lakewood, OH (US); Philip B. Loudin, Boulder, CO (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 2 days.

(21) Appl. No.: 10/140,607

(22) Filed: May 7, 2002

(65) Prior Publication Data

US 2002/0124934 A1    Sep. 12, 2002

Related U.S. Application Data

(63) Continuation-in-part of application No. 09/539,856, filed on Mar. 31, 2000, now Pat. No. 6,688,353.

(51) Int. Cl.
*B60C 23/00* (2006.01)
*B60C 23/04* (2006.01)

(52) U.S. Cl. .................... 152/152.1; 340/442

(58) Field of Classification Search ............ 152/152.1, 152/367; 73/146–146.5; 340/442, 445–448
See application file for complete search history.

(56) References Cited

U.S. PATENT DOCUMENTS

| 6,217,683 | B1 | 4/2001 | Balzer et al. | |
| 6,239,737 | B1 | 5/2001 | Black | |
| 6,255,940 | B1 | 7/2001 | Phelan et al. | |
| 6,534,711 | B1 * | 3/2003 | Pollack | 174/52.2 |
| 6,546,982 | B1 * | 4/2003 | Brown et al. | 152/152.1 |
| 6,688,353 | B1 * | 2/2004 | Koch | 152/152.1 |
| 2001/0008083 | A1 | 7/2001 | Brown | |
| 2002/0075145 | A1 * | 6/2002 | Hardman et al. | 340/442 |

FOREIGN PATENT DOCUMENTS

| EP | 1048492 A2 | 11/2000 |
| EP | 1049196 A1 | 11/2000 |
| WO | WO 99/41093 | 8/1999 |
| WO | WO 01/74609 A1 | 10/2001 |
| WO | WO 02/07993 A2 | 1/2002 |
| WO | WO 02/07993 A3 | 1/2002 |
| WO | PCT/US03/13512 | 10/2003 |

* cited by examiner

*Primary Examiner*—Geoffrey L. Knable
(74) *Attorney, Agent, or Firm*—Fred H. Zollinger, III; Thomas R. Kingsbury (57) ABSTRACT

A monitoring device and patch assembly and method for forming the assembly is disclosed wherein the patch includes a platform and at least a portion of the monitoring device is positioned adjacent the patch. At least a portion of the monitoring device and platform are encapsulated to connect the monitoring device to the patch.

8 Claims, 9 Drawing Sheets

MONITORING DEVICE AND PATCH ASSEMBLY

CROSS REFERENCE TO RELATED APPLICATIONS

This application is a continuation-in-part of currently application Ser. No. 09/539,856 filed Mar. 31, 2000, now U.S. Pat. No. 6,688,353, the disclosures of which are incorporated herein by reference.

BACKGROUND OF THE INVENTION

1. Technical Field

The present invention generally relates to a patch for mounting an electronic monitoring device to the inside surface of a pneumatic tire. More particularly, the present invention relates to a patch having an electronic monitoring device encapsulated directly to the patch to form an assembly that is mounted to a pneumatic tire. The invention also related to methods of forming the monitoring device and patch assembly.

2. Background Information

Monitoring the internal conditions of a pneumatic tire while the tire is in use on a vehicle is becoming increasingly desired in the art. One problem with this technology is protecting the relatively sensitive electronic monitoring device in the relatively harsh environment inside a tire. Another problem in the art is that the inner surface of a tire does not have surfaces where monitoring devices may be easily mounted in a secure manner.

Protecting monitoring devices against harsh tire conditions has been accomplished in the past by encapsulating the monitoring device in an encapsulation or potting material. The potting material is poured over the monitoring device and fills the voids around the elements of the monitoring device. The material hardens and forms a protective block having a high modulus of elasticity around the elements of the monitoring device. The monitoring device is protected in this manner from the flexing and shock forces experienced in a pneumatic tire.

Rubber patches are also known in the art to mount monitoring devices to the inner surface of a tire. The potted monitoring device has been connected to the patch with adhesive and the patch was then adhered to the innerliner of the tire. Other methods of mounting monitoring devices inside tires include forming a pocket in the tire and placing the monitoring device in the pocket. Other methods have placed a rubber patch over the top of the monitoring device to hold the monitoring device against the tire sidewall.

One problem with these mounting solutions is the relatively high number of steps required to mount the monitoring device to the tire. Another problem is the number of times the monitoring device must be handled prior to mounting inside the tire. More importantly, the users of the monitoring devices desire stronger connections between the monitoring device and the tire.

Another problem in the art occurs when the antenna is mounted in a different substrate than the monitoring device. In these situations, a connection must be formed between the monitoring device and the antenna. An example of this situation is shown in patent application Ser. No. 09/301,781 filed Apr. 29, 1999, which is owned by the Assignee of the present application. In this situation, a pair of connectors are used to form the direct physical connection between the antenna and the monitoring device. The problem that has occurred is that the adhesive used to bond the monitoring device to the patch is forced around the connectors sometimes flowing into the connectors. The art desires a solution to this problem by providing a method of connecting the encapsulated monitoring device to a patch while not fouling the connectors.

SUMMARY OF THE INVENTION

The present invention provides a monitoring device and patch assembly that is ready for mounting to the inside of the tire. The invention solves the problems in the art by directly potting the monitoring device to an attachment patch to form an assembly that may be mounted to a tire.

In one embodiment of the invention, the assembly includes a patch having a platform. An electronic monitoring device or a monitoring package is positioned adjacent the patch with an encapsulation material surrounding at least a portion of the electronic monitoring device/package and at least a portion of the platform. The encapsulation material connects the monitoring device/package to the patch.

The invention also provides a patch and monitoring device assembly wherein the patch includes a platform having an overhang. At least a portion of the overhang and the monitoring device are encapsulated to connected the monitoring device to the patch.

Another aspect of the invention provides placing the connecting elements used to electrically connect the monitoring package to an antenna embedded within the patch in a location where the connecting elements are surrounded by the encapsulation material.

The method of the present invention includes the steps of providing a patch having a platform, positioning at least a portion of an electronic monitoring device adjacent the patch, and encapsulating at least a portion of the electronic monitoring device and at least a portion of the platform.

BRIEF DESCRIPTION OF THE DRAWINGS

Similar numbers refer to similar parts throughout the specification.

DESCRIPTION OF THE PREFERRED EMBODIMENTS

An assembly used to mount an electronic monitoring device to the inside surface of a pneumatic tire is indicated generally by the numeral 10 in the drawings. Assembly 10 preferably mounts the electronic monitoring device to the innerliner 12 of a pneumatic tire 14 so that the electronic monitoring device may monitor at least one engineering condition of tire 14.

Figure 1:
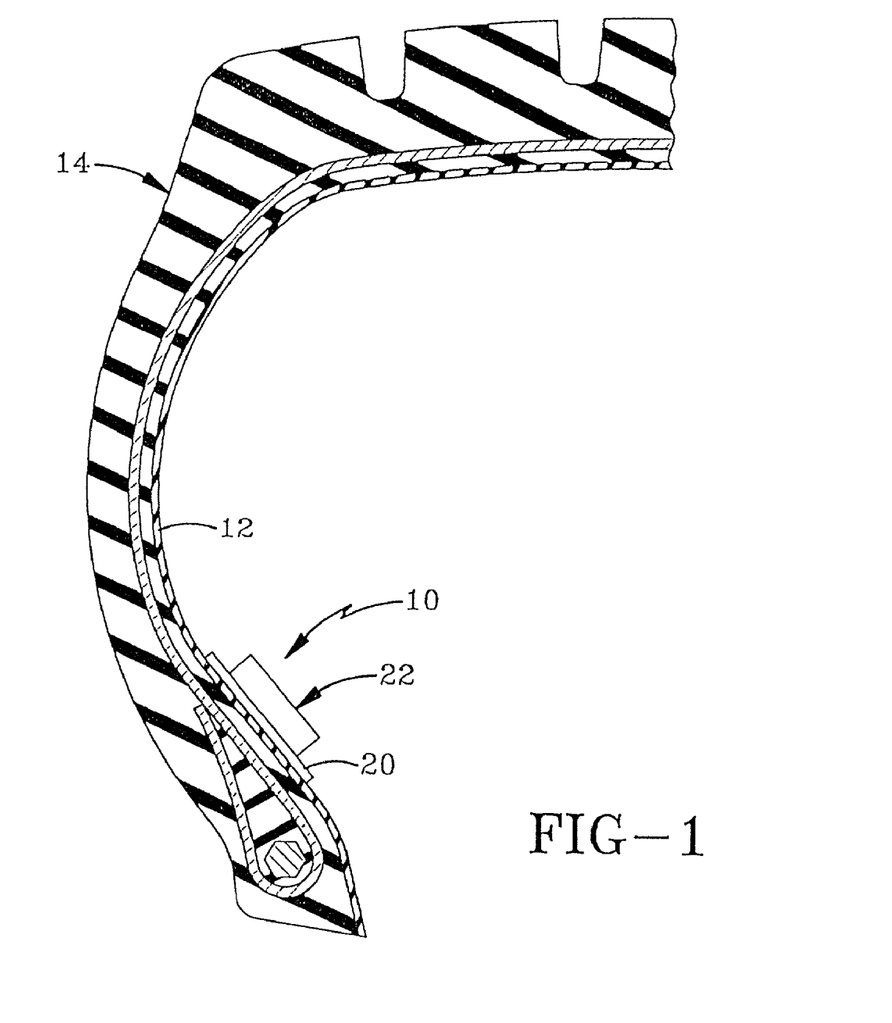
FIG. 1 is a sectional view of a pneumatic tire with an encapsulated monitoring device mounted to the innerliner of the tire with an attachment patch.

Assembly 10 generally includes an attachment patch 20 and an encapsulated monitoring device 22. Attachment patch 20 is used to connect encapsulated monitoring device 22 to innerliner 12 so that the monitoring device may perform its measurements. Attachment patch 20 includes a first side 24 configured to receive encapsulated monitoring device 22 and a second side 26 configured to attach to tire 14. Attachment patch 20 is preferably fabricated from rubber. The rubber material is preferably vulcanized at a preselected temperature and a time sufficient to vulcanize the patch. The patch may be fabricated from a rubber selected from the group consisting of Ethylene Propylene Diene Monomer (EPDM) rubber, butyl rubber, natural rubber, neoprene, and mixtures thereof. One preferred embodiment is a mixture of chlorobutyl rubber and natural rubber. Another preferred embodiment is bromobutyl rubber. Another embodiment is a mixture of Styrene-Butadiene rubber (SBR) natural rubber. Typically, patches made from these rubber compositions may be cured by heating to a temperature of about 150 degrees Celsius and holding this temperature for about thirty minutes. The time and temperature may be modified as necessary to achieve sufficient curing of the patch for further manufacturing steps. The present invention also contemplates that patch 20 may be fabricated from a variety of other rubber mixtures known in the art. In addition to rubbers, patch 20 may be fabricated from other materials that may be adhered to tire 14 and accept encapsulated monitoring device 22 as described below. Thermoplastic Elastomers, Thermoplastic Urethanes or Thermoplastic Olefins may also be used to form attachment patch 20.

Figure 2:
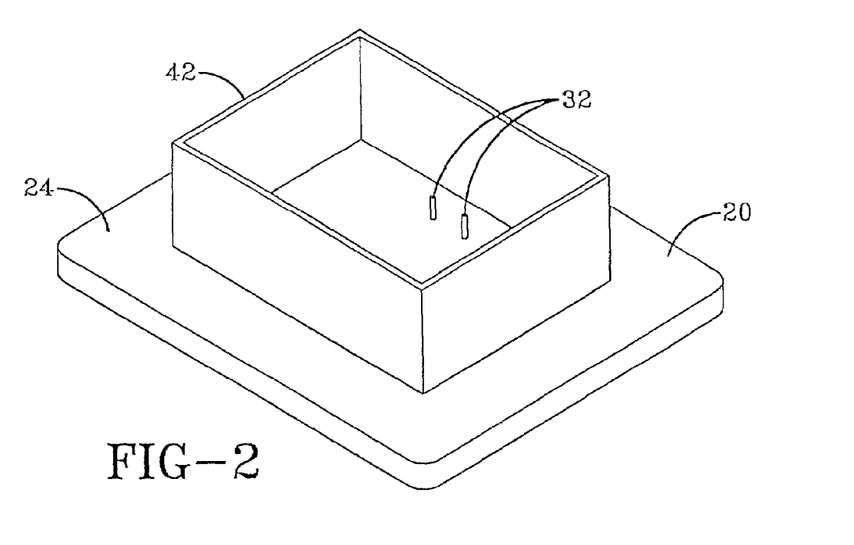
FIG. 2 is a perspective view of the attachment patch with a potting frame assembled and placed on the upper surface of the attachment patch to surround the connectors for the antenna.
Figure 3:
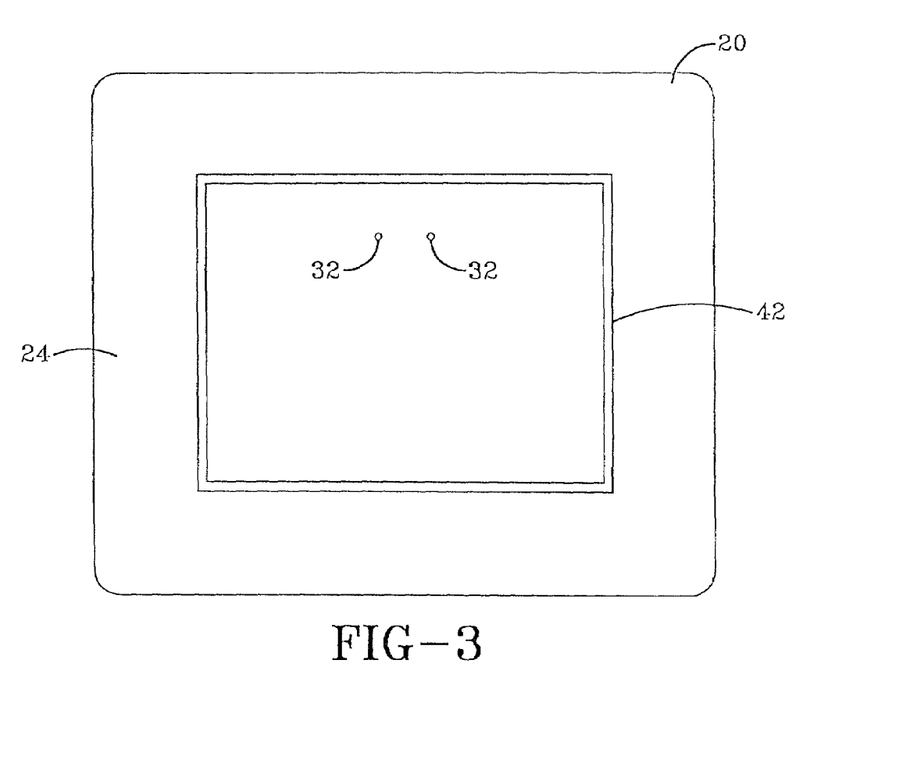
FIG. 3 is a top plan view of FIG. 2.

In one embodiment of the present invention, patch 20 carries an antenna 30 used to send and receive signals from encapsulating monitoring device 22. Antenna 30 includes connecting elements 32 that protrude outwardly from the outer perimeter of patch 20. Connecting elements 32 may be the male or female portion of a pin and socket-type connector. Connecting elements 32 are used to allow a monitoring package 34 to be plugged into antenna 30 after antenna 30 is cured into to patch 20. Antenna 30 may be connected to patch 20 in a variety of other ways other than being cured into patch 20. For instance, antenna 30 may be mounted on an outer surface of patch 20. Monitoring package 34 may include the various sensors, controllers, memory devices, and power supplies necessary to perform the monitoring, transmitting, and receiving functions desired in the art. Monitoring package 34 must be connected to antenna 30 so that it may communicate with a data gathering device position outside of tire 14. Monitoring package 34 also includes connecting elements 36 that are configured to mate with connecting elements 32 to form a direct electrical connection between monitoring package 34 and antenna 30.

Figure 5:
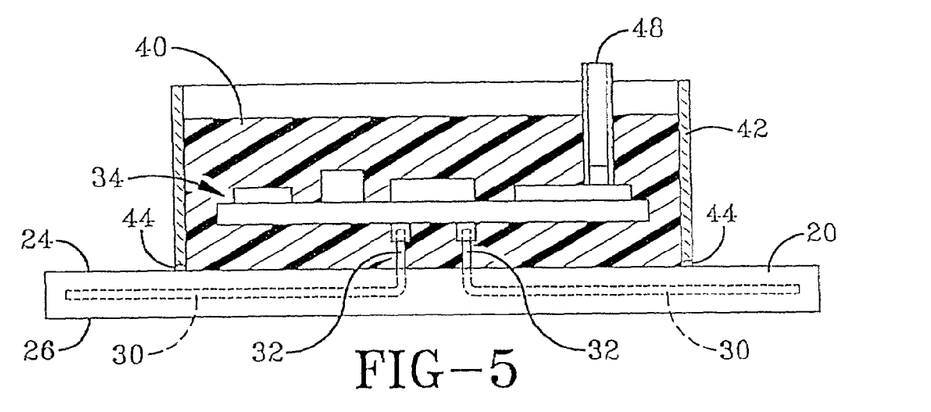
FIG. 5 is a view similar to FIG. 4 showing the potting frame substantially filled with the potting material.

In accordance with one of the objectives of the present invention, monitoring package 34 is encapsulated with an encapsulation material 40 directly to attachment patch 20 such that encapsulation material 40 is chemically and/or physically bonded to attachment patch 20. In one embodiment of the invention, a frame 42 is fabricated and attached to first side 24 of attachment patch 20 by an adhesive 44 by applying adhesive 44 around frame 42 and ensuring a continuous bead of adhesive 44 around the perimeter. In one embodiment, a copper faced board having a thickness of 0.0345 inches is used to fabricate frame 42 by soldering the ends of four pieces together to form frame 42. Another preferred material for forming frame 42 is glass-filled epoxy. In other embodiments, substantially any material may be used for frame 42 that will not interfere with a radio frequency signal if frame 42 remains connected to encapsulated monitoring device 22 as depicted in FIG. 5 and will not melt at the relatively high encapsulation or potting temperature. This temperature is typically 95-125 degrees Celsius.

Figure 4:
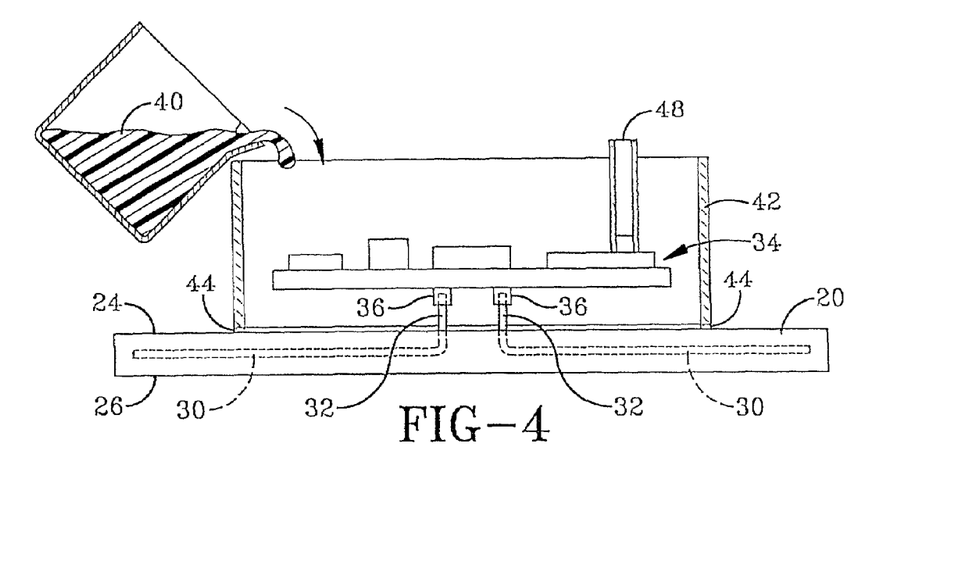
FIG. 4 is a sectional side view of the attachment patch and the potting frame with the electronic monitoring device positioned within the potting frame and the potting material being poured into the potting frame.
Figure 4A:
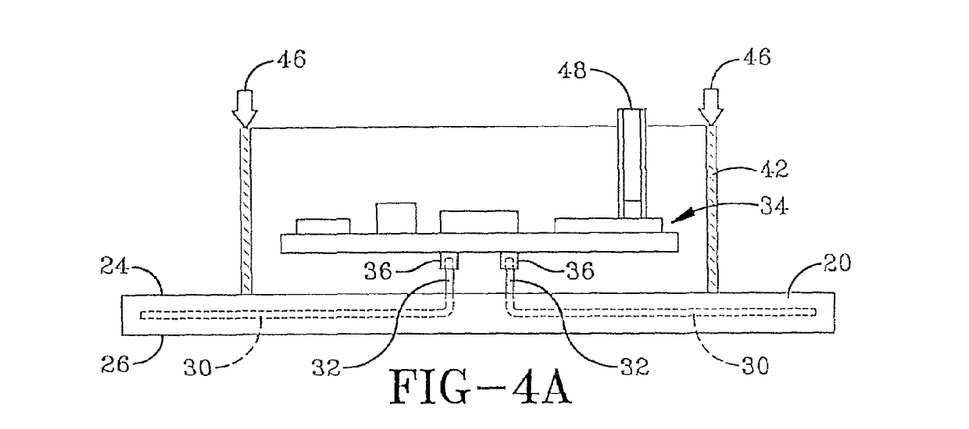
FIG. 4A is a view similar to FIG. 4 showing an alternative embodiment of the invention where the potting frame is held against the attachment patch with pressure.

In another embodiment of the invention, frame 42 is held against first side 24 of attachment patch 20 by applying pressure as indicated by the numeral 46 against frame 42. Pressure 46 maintains the correct position of frame 42 and prevents encapsulation material 40 from leaking out from between frame 42 and attachment patch 20.

Frame 42 is positioned on attachment patch 20 such that connecting elements 32 are disposed within frame 42. The position of connecting elements 32 with respect to frame 42 is referred to as the connection location. It is an important aspect of the present invention to provide strength around the connection location so that the connections between monitoring package 34 and antenna 30 do not become loose with extended use of patch 10.

Depending on the material used to fabricate frame 42, frame 42 may need to be sandblasted and degreased with solvent to clean the surface prior to performing the encapsulation steps of the present invention. For instance, the copper-faced board discussed above is preferably sandblasted and solvent washed to clean the surface. In addition, first side 24 of attachment patch 20 is preferably cleaned and primed with a 3% 1,3,5-Trichloro-s-triazinetrione (Trichloroisocyanuric acid) (TCTT) solutions in butyl actetate. Side 24 was then wiped with a piece of Rymplecloth to remove the excess solvent and surface dirt. Patch 20 was then allowed to dry thoroughly. Adhesive 44 used around frame 42 is preferably FUSOR® 320 (five parts by weight)/310 B (two parts by weight). FUSOR® is available from Lord Corporation. Adhesive 44 is then cured in an oven at 80 degrees Celsius for thirty minutes.

Various other types of adhesives, frame materials, and surface preparations may be used without departing from the scope of the present invention. The specific materials and times described above are merely for the purpose of providing an exemplary embodiment of the invention and the best mode now known for performing the invention.

Monitoring package 34 is then positioned within frame 42 so that it is suspended within frame 42 adjacent first side 24. A chimney 48 may be attached to a sensor (such as a pressure sensor or a temperature sensor) on monitoring package 34 so that it may communicate with the atmosphere surrounding encapsulated monitoring device 22 after encapsulation material 40 is cured. Chimney 48 provides an air passage 50 to monitoring package 34.

Figure 6:
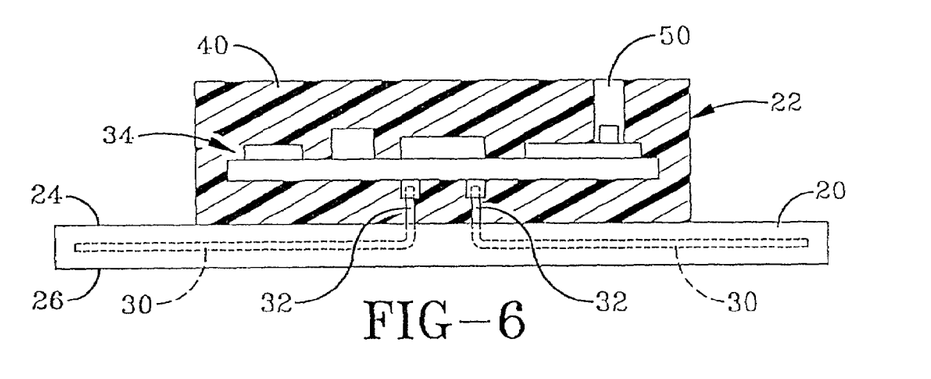
FIG. 6 is a view similar to FIG. 4 showing one embodiment of the final product.

After monitoring package 34 is positioned adjacent first side 24 and within frame 42, encapsulation material 40 is introduced inside frame 42 to substantially surround monitoring package 34 and to fill substantially all voids around monitoring package 34 as depicted in FIG. 5. In the preferred embodiment of the present invention, encapsulation material 40 is a formulation including 100 gm STYCAST® 2651; 7 gm Catalyst 9; and 3 drops defoamer 88. In another embodiment of the invention, encapsulation material 40 is a formulation including 110 gm STYCAST® 2651; 10 gm Phenyl Gycidyl Ether; 9.4 gm Catalyst 9; and 6 drops of defoamer 88. These materials were mixed together at room temperature until thoroughly mixed. The formulation was degassed until foaming subsided. The formulation was then poured into frame 42 and allowed to cure in an oven at 55 degrees Celsius for thirty minutes. It was then post-cured at 80 degrees Celsius for thirty minutes. This process results in a strong encapsulated monitoring device 22 directly bonded to attachment patch 20. Frame 42 may be left in position as depicted in FIG. 5 or removed as depicted in FIG. 6.

Various other encapsulation materials 40 will also function with the present invention. For instance, a variety of epoxies and urethanes that are pourable and cure to a rigid tough material having a high modulus of elasticity may be used. It is desired that encapsulation material 40 having a Young's modulus of at least 30,000 psi and which is capable of being molded around electronic monitoring package 34. Preferably, encapsulation material 40 will have a Young's modulus at least 100,000 psi.

STYCAST® 2651 is the preferred encapsulation material. Alternatively, high melting point polyurethanes and/or polyureas may be utilized. The polyurethanes are derived from polysiocyanates which generally have the formula $R(NO)_n$ where n is an integer of 2, 3 or 4 with approximately 2 being preferred. The "n" may, however, vary and often is not an integer because combinations of various polysiocyanates can be utilized. R is an aliphatic having from about 2 to about 20 carbon atoms or preferably an aromatic including an alkyl substituted aromatic having from about 6 to about 20 carbon atoms with from about 6 to about 15 carbon atoms being desired, or combinations thereof. Examples of suitable polysiocyanates include 1,6-diisocyanto hexane; 2,2,4- and/or 2,4,4-trimethylhexamethylene diisocyanate; p- and m-tetramethylxylene diisocyanate; dicyclohexylmethane-4,4'-diisocyanate (Hydrogenated MDI); 4,4-methylene diphenyl isocyanate (MDI); p- and m-phenylene diisocyanate; 2,4- and/or 2,6-toluene diisocyanate (TDI); durene-1,4-diisocyanate; isophorone diisocyanate and isopropylene bis-(p-phenyl isocyanate). TDI is desirably utilized. The various diphenylmethane diisocyanates (MDI) and mixtures of MDI with polymeric MDI having an average isocyanate functionality of from about 2 to about 3.2 are preferred.

The preparation of the polyurethanes and/or polyureas are well known to the art and to the literature. For example, a short chain oligomer or polymer derived from polyester or polyether polyols generally having a molecular weight of from about 55 to about 1,000 and preferably from about 6 to about 200 are reacted with the above-noted diisocyanates to form a urethane prepolymer. Similarly, a short chain diamine can be utilized and reacted with the above-noted diisocyanates to form a urea prepolymer. Aromatic diisocyanates are generally utilized to yield high melting point urethane or urea prepolymers which also generally have a high modulus of elasticity. The resulting prepolymer is subsequently reacted with diols, diamine, diacids, or amino alcohols, and the like to cure the same and form a polyurethane or polyurea. Alternatively, the polyurethanes and/or polyureas are formed by reacting an existing prepolymer with the above-noted curing or chain extending agents.

The equivalent ratio of isocyanate groups (NCO) reacted with the hydroxyl groups (OH) or amine groups ($NH_2$) of the short chain compound is generally from about 0.90 to about 1.10, desirably from about 0.95 to about 1.05, and preferably from about 0.98 to about 1.02.

In general, thermoset epoxy resins are preferred. The epoxy resin or polymer is generally formed by the reaction of bisphenol A and epichlorohydrin. The preparation of epoxy resins is well known to the literature and to the art. Generally, epichlorohydrin is reacted with a variety of hydroxy, carboxy, or amino compounds to form monomers with two or more epoxied groups, and these monomers are then used in the reaction with bisphenol A. Examples of such compounds are the diglycidyl derivative of cyclohexane-1, 2-dicarboxylic acid, the triglycidyl derivates of p-aminophenol and cyanuric acid, and the polyglycidyl derivative of phenolic prepolymers. Epoxidized diolefins can also be employed. Various co-reactants can be utilized to cure epoxy resins either through the epoxied or hydroxyl groups. Polyamines such as primary or secondary amines are a common curing agent such as aliphatic amines having a total of from about 2 to about 18 carbon atoms and desirably from about 4 to about 8 carbon atoms. Suitable compounds include diethylene triamine, triethylene tetraamine, tetraethylene pentaamine, 4,4'-diaminodiphenylmethane, and polyaminoamides. A combination of diethylene triamine and tetraethylene pentaamine is often desired. Aromatic amines can also be utilized such as those having a total of from 6 to 20 carbon atoms such as meta or paraphenylene diamine and the like. Other curing agents including polythiols, dicyandiamide (cyanoguanidine), diisocyanates, and phenolic prepolymers. Curing of epoxy resins can also be achieved by ring opening polymerization of the epoxied groups using either Lewis acids or Lewis bases.

Figure 11:
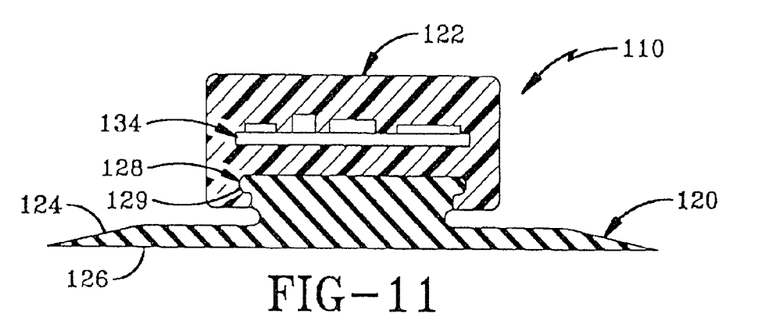
FIG. 11 is a section view of the assembly with the mold removed.
Figure 12:
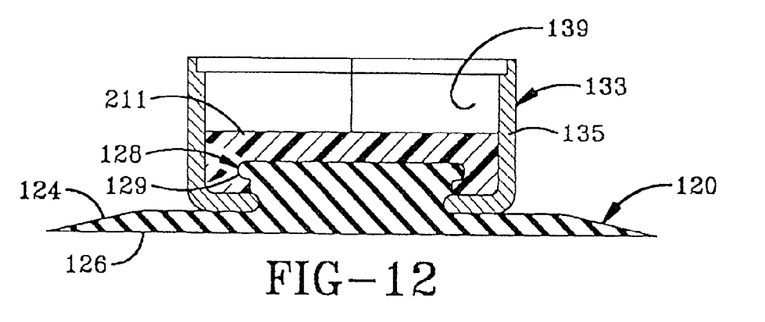
FIG. 12 is a section view showing an initial step in forming a second alternative embodiment of the assembly of the invention.

A first alternative embodiment of an assembly used to mount an electronic monitoring device to the inside surface of a pneumatic tire is indicated generally by the numeral 110 in FIG. 11. Assembly 110 may be used to mount the electronic monitoring device to the innerliner 12 of a pneumatic tire 14 so that the electronic monitoring device may monitor at least one engineering condition of tire 14. The engineering condition may be the temperature of tire 14, the pressure of tire 14, or other conditions known in the art.

Assembly 110 generally includes an attachment patch 120 and an encapsulated monitoring device 122 (FIG. 11). Attachment patch 120 is used to connect encapsulated monitoring device 122 to innerliner 12 so that the monitoring device may perform its measurements.

Figure 7:
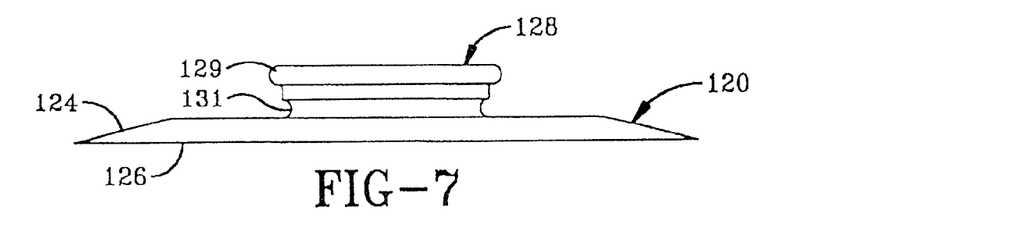
FIG. 7 is a side view of the attachment patch used in a first alternative embodiment of the invention.

Attachment patch 120 includes a body having a first side 124 configured to receive encapsulated monitoring device 122 and a second side 126 configured to be attached to tire 14. Attachment patch 120 is preferably fabricated from rubber as described above with respect to patch 20. In addition to rubbers, patch 120 may be fabricated from other materials that may be adhered to tire 14 and accept encapsulated monitoring device 122. Thermoplastic Elastomers, Thermoplastic Urethanes or Thermoplastic Olefins may also be used to form attachment patch 120.

A platform 128 extends from first side 124 of attachment patch 120. Platform 128 includes a sidewall that extends generally vertically from first side 124 of patch 120. Platform 128 includes at least one overhang 129 that extends outwardly from the sidewall of platform 128. Overhang 129 includes a lower surface that opposes first side 124 such that a space is defined between overhang 129 and first side 124. In one embodiment of the invention, overhang 129 may be a single continuous protrusion that extends about the circumference of platform 128. In another embodiment of the invention, overhang 129 may include a plurality of spaced overhang portions disposed about the circumference of platform 128. In a further embodiment, overhang 129 may be a single protrusion that does not extend around the entire periphery of the platform 128. In the embodiment of the invention depicted in the drawings, overhang 129 extends from the upper surface of platform 128. In other embodiments, overhang 129 extends out from an intermediate portion of the sidewall of platform 128. In the embodiment of the invention depicted in the drawings, platform 128 is solid. In other embodiments, platform 128 may be hollow or define a plurality of openings. When hollow, patch 128 may receive portions of the encapsulation material. Overhang 129 may have a smoothly curved outer surface and is free of sharp edges.

Figure 8:
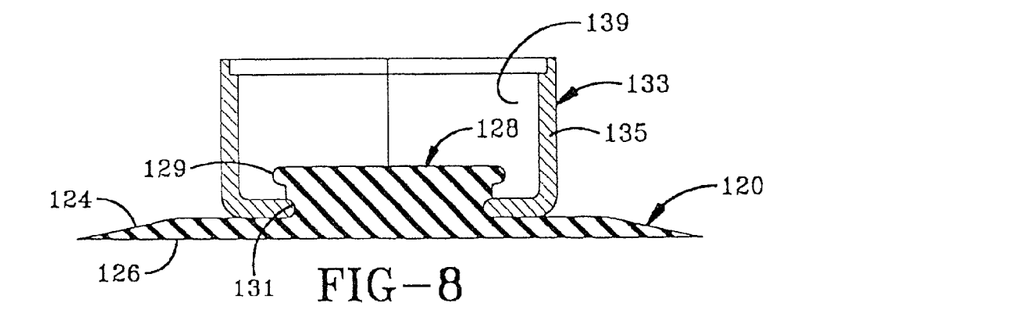
FIG. 8 is a section view showing a first portion of the mold connected to the attachment patch.
Figure 9:
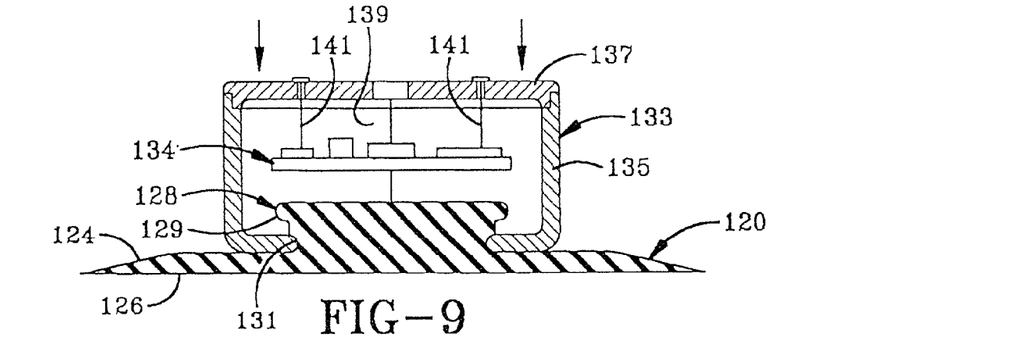
FIG. 9 is a section view showing a second portion of the mold being connected to the first portion of the mold with the electronic monitoring device being suspended by the second portion of the mold.

Platform 128 may also define a recessed collar 131 that is configured to receive a mold 133 that is used to form encapsulated monitoring device 122. Collar 131 is defined by a recess in the sidewall of platform 128. Mold 133 may include a first portion 135 and a second portion 137 that cooperate to form an encapsulation chamber 139 bounded by portions 135 and 137 as well as patch 120. In the exemplary embodiment of the invention, first mold portion 135 engages collar 131 such that platform 128 projects up into chamber 139 with overhang 129 disposed entirely within chamber 139. In other embodiments of the invention, first mold portion 135 abuts against platform 128 without the necessity of collar.

In the first alternative embodiment of the invention, assembly 110 is formed by first positioning mold portion 135 against patch 120 to locate platform 128 and overhang 129 in chamber 139. This configuration is depicted in FIG. 8. The user then positions the monitoring package 134 within chamber 139. Monitoring package 134 may include the elements described above with respect to monitoring package 34 and may, in some embodiments, include the antenna of the system. In the exemplary embodiment, monitoring package 134 is suspended within chamber 139 by holders 141 that are attached to one of mold portions 135 and 137. The suspension of monitoring package 134 allows the encapsulation material 140 to substantially surround and protect monitoring package 134. Holders 141 may be thin wires that suspend monitoring package 134 within chamber 139. Holders 141 may be removed or left in place when the encapsulation material 140 is placed in chamber 139. Holders 141 may be fabricated from a metal or a nonmetal.

Figure 10:
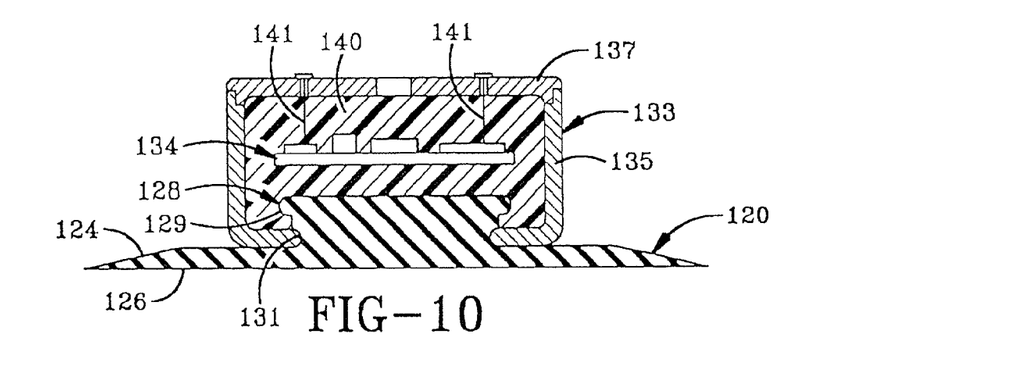
FIG. 10 is a section view showing the encapsulation material disposed in the mold around the electronic monitoring device.

Once monitoring package 134 is in place, encapsulation material 140 (as described above) is placed into chamber 139 to surround and protect monitoring package 134. A breathing tube may be created form a pressure sensor if such a tube is desired. Encapsulation material 140 also surrounds overhang 129 such that a mechanical interference fit is created between encapsulation material 140 and patch 120 in addition to any bonding that occurs between encapsulation material 140 and patch 120. Platform 128 and overhang 129 thus help form a secure connection between encapsulation material 140 and patch 120. This step is depicted in FIG. 10. Encapsulation material 140 may then be cured. If desired, mold 133 is then removed yielding assembly 110. In other embodiments of the invention, mold 133 is left in place and forms part of assembly 110.

Figure 13:
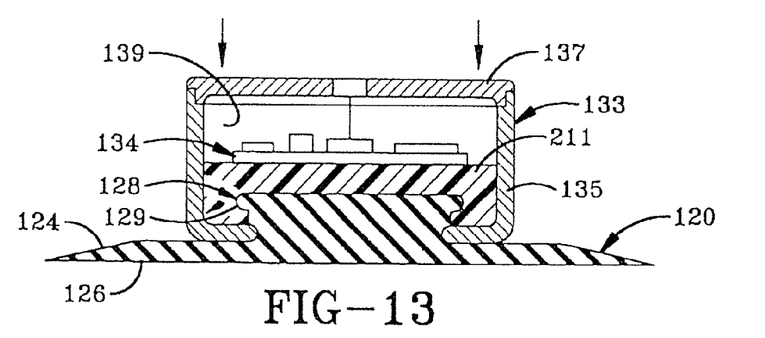
FIG. 13 is a section view showing the electronic monitoring device and a portion of the encapsulation material being installed.
Figure 14:
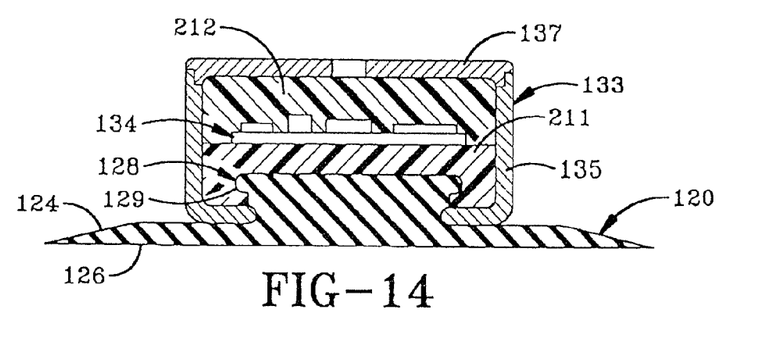
FIG. 14 is a section view showing the remaining portion of the encapsulation material placed in the mold.
Figure 15:
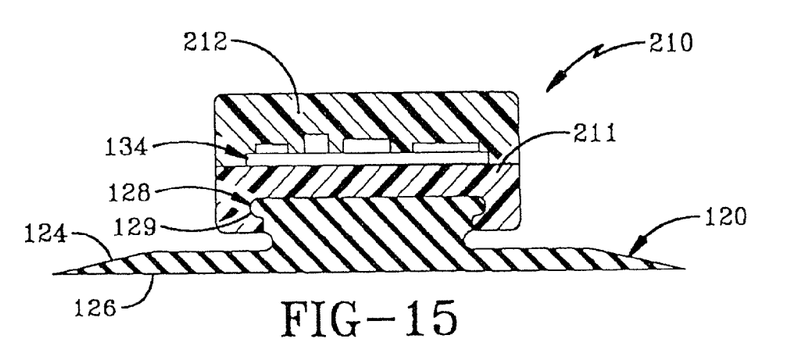
FIG. 15 is a section view of the second alternative embodiment of the assembly of the invention.
Figure 16:
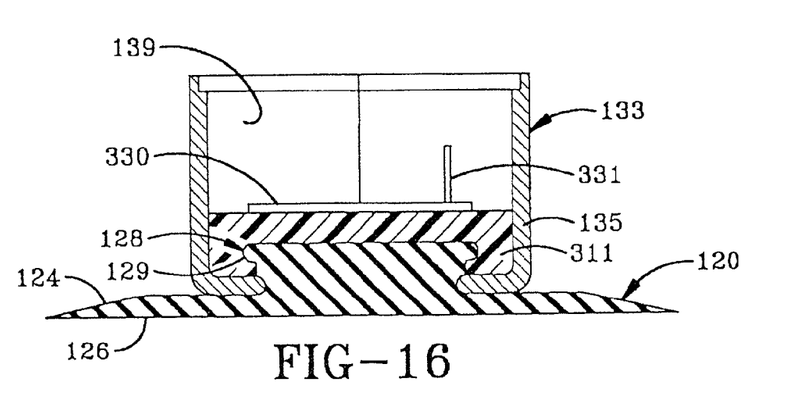
FIG. 16 is a section view showing an initial step in forming a third alternative embodiment of the assembly of the invention.

In the second alternative embodiment of the invention depicted in FIGS. 12-15, assembly 210 is formed without the use of holders 141. Assembly 210 includes many of the same elements described above with respect to assembly 110 and the same numbers are used to refer to these elements. In the second alternative embodiment, monitoring package 134 is suspended within chamber 139 by filling a first portion of the chamber with a first portion 211 of encapsulation material 140 and resting monitoring package 134 on first portion 211 (FIG. 13). A second portion 212 of encapsulation material 140 is then placed over monitoring package 134 to substantially surround and protect monitoring package 134. A breathing tube may be formed for a pressure sensor if desired. Second portion 212 may be added while first portion 211 is curing so that the two portions bond together.

In the third alternative embodiment of the invention depicted in FIGS. 16-20, assembly 310 is formed without the use of holders 141 and the antenna 330 of the monitoring device is spaced from monitoring package 134. Assembly 310 includes many of the same elements described above with respect to assembly 110 and the same numbers are used to refer to these elements. In the third alternative embodiment, antenna 330 is suspended within chamber 139 by filling a first portion 311 of chamber 139 with encapsulation material 140. Antenna 330 is then placed on top of first portion 311. In other embodiments, antenna 330 may be suspended with a holder as described above with respect to holders 141. Antenna 330 includes a connecting element 331 that is used to electrically connect antenna 330 with monitoring package 134. Connecting element 331 may be a plug and socket connection, a soldered wire, an electrical coupling connection, or the like.

Figure 17:
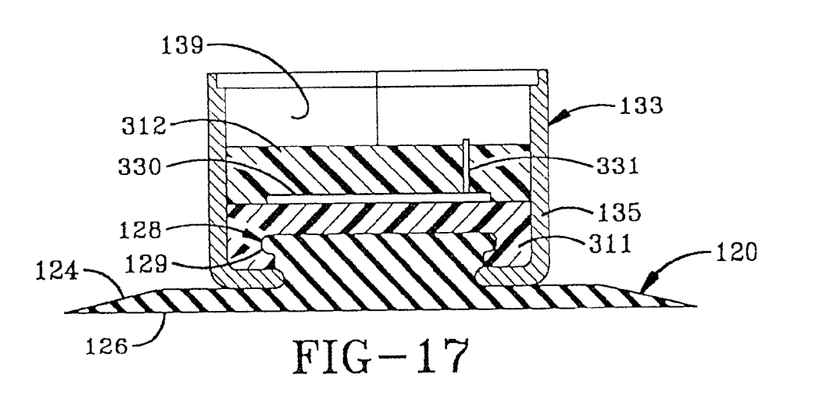
FIG. 17 is a section view showing an antenna installed and a second layer of encapsulation material disposed over the antenna.
Figure 18:
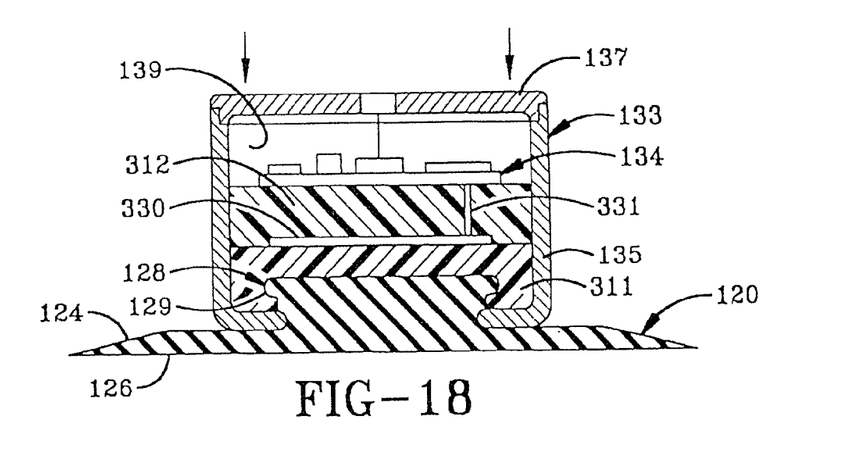
FIG. 18 is a section view showing the monitoring device and second portion of the mold being installed.
Figure 19:
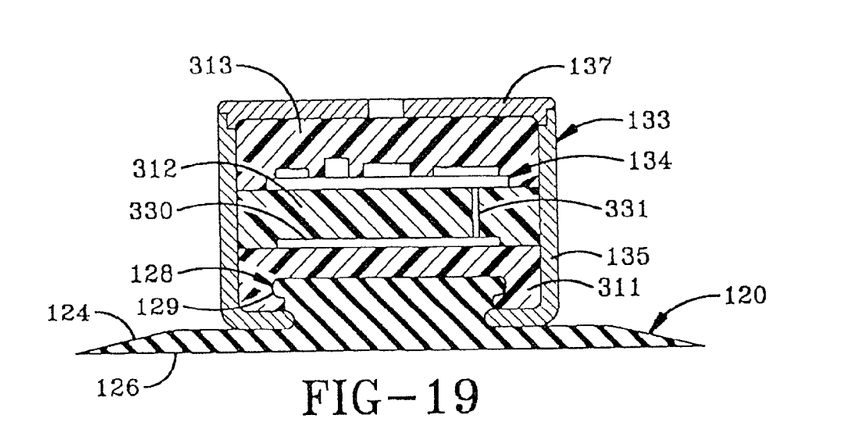
FIG. 19 is a section view showing the final layer of encapsulation material installed.
Figure 20:
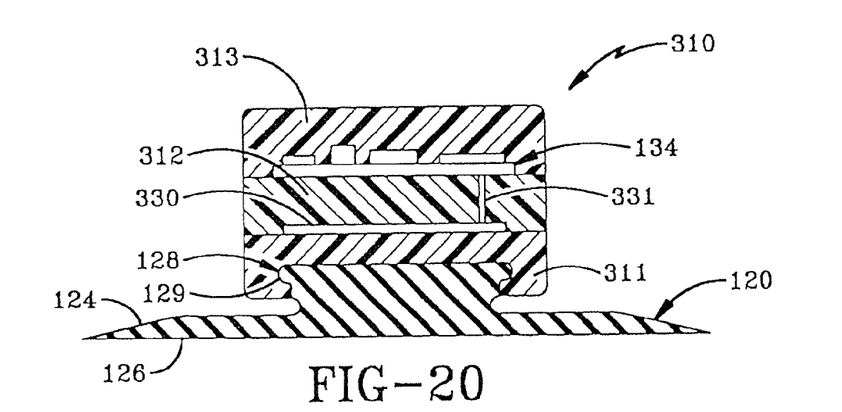
FIG. 20 is a section view of the third alternative embodiment of the invention.
Figure 21:
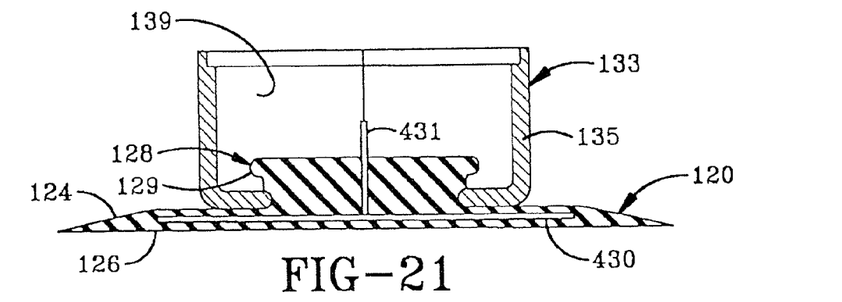
FIG. 21 is a section view showing an initial step in forming a fourth alternative embodiment of the assembly of the invention.

Monitoring package 134 is suspended within chamber 139 by filling a second portion of the chamber with a second portion 312 of encapsulation material 140 and resting monitoring package 134 on second portion 312 (FIGS. 17 and 18). In another embodiment, monitoring package 134 may be supported by appropriate holders. Monitoring package 134 is connected to connecting element 331 at this time. A third portion 313 of encapsulation material 140 is then placed over monitoring package 134 to substantially surround and protect monitoring package 134. A breathing tube may be formed for a pressure sensor if desired. Second portion 312 may be added while first portion 311 is curing so that the two portions bond together. Similarly, third portion 313 may be added while second portion 312 is curing so that the two portions bond together.

Figure 22:
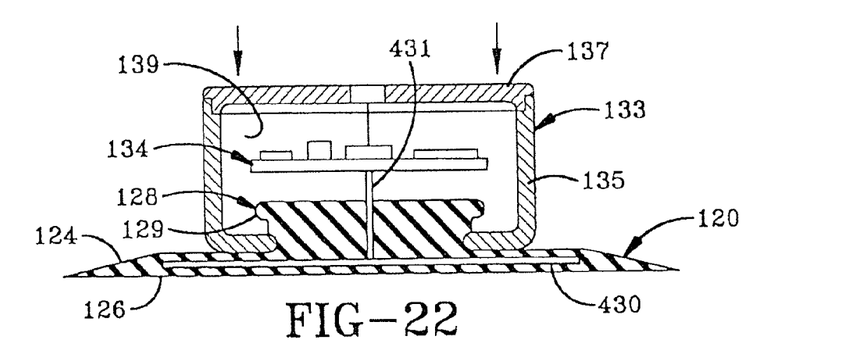
FIG. 22 is a section view showing a monitoring device suspended within the mold.
Figure 23:
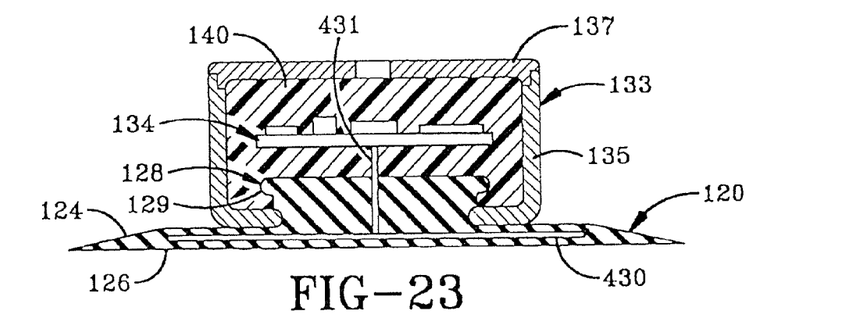
FIG. 23 is a section view showing the encapsulation material installed in the mold.
Figure 24:
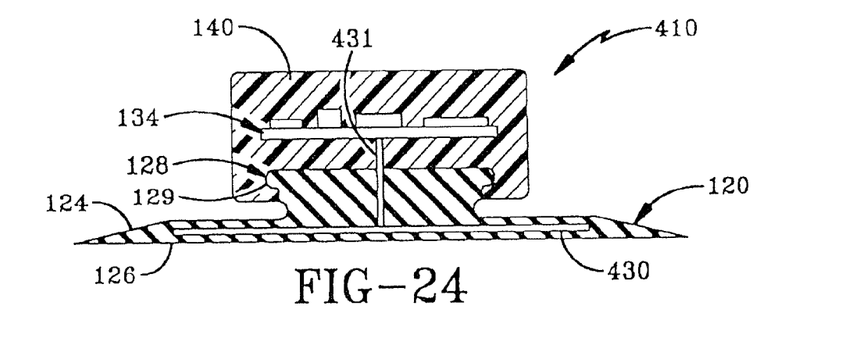
FIG. 24 is a section view showing the fourth alternative embodiment of the invention.

The fourth alternative embodiment of the invention is depicted in FIGS. 21-24 with the fourth alternative embodiment of the assembly being indicated generally by the numeral 410. In the fourth embodiment, assembly 410 includes an antenna 430 connected to patch 120. In the exemplary embodiment, antenna 430 is mounted to patch 120 and may be embedded within patch 120. A connecting element 431 is connected to antenna 430 and extends up through platform 128 into chamber 139. Monitoring package 134 is connected to connecting element 131 and may be suspended within chamber 139 by connecting element 131 as depicted in FIG. 22. Encapsulation material 140 is then placed into chamber 139 to surround monitoring package 134. In other embodiments, monitoring package 134 may be suspended within chamber 139 by any of the methods described above.

In each of these embodiments, the cured encapsulation material cooperates with overhang 129 on platform 128 to form an interference fit preventing the encapsulated monitoring package 134 from being separated from patch 102.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. In combination:
a pneumatic tire having an inner surface;
a monitoring package for a tire monitoring device;
a flexible rubber patch for mounting the monitoring package to the inner surface of the pneumatic tire; the patch comprising a flexible rubber body having a first side, a second side, and a platform extending from the first side; the body being fabricated from a material;
the second side of the rubber patch being mounted to the inner surface of the tire; and
at least first and second layers of encapsulation material cooperating to substantially surround the monitoring package and at least a portion of the platform to connect the monitoring package to the patch; a first layer of the encapsulation material having been directly applied and then cured to the platform so as to directly and securely bond with the material of the platform; the first layer of encapsulation material being disposed between the monitoring package and the platform; the second layer of encapsulation material having been directly applied and then cured to the first layer so as to directly and securely bond with the first layer of encapsulation material.

2. The combination of claim 1, wherein the platform has an overhang; the first layer of encapsulation material substantially surrounding the overhang of the platform.

3. The combination of claim 1, further comprising an antenna substantially surrounded by the encapsulation material; the antenna being connected to the monitoring package.

4. A patch for mounting a monitoring device to the inside of a pneumatic tire; the patch comprising:
a flexible rubber body having a first side, a second side, and a platform extending from the first side;
the platform including an overhang having a lower surface spaced from the first surface of the body; the overhang including a plurality of spaced overhang portions disposed about the platform;
a monitoring package for an electronic monitoring device;
an encapsulation material substantially surrounding the monitoring package and the overhang to connect the monitoring package to the patch; the encapsulation material having been directly applied and then cured to the platform so as to directly and securely bond with the rubber of the platform to connect the encapsulation material and the monitoring package to the material of the platform;
an encapsulation mold defining an encapsulation chamber; the monitoring package, the encapsulation material, and the overhang being disposed within the encapsulation chamber; the platform extending through a portion of the mold; and
a portion of the encapsulation mold disposed between the lower surface of the overhang and the first surface of the body.

5. The patch of claim 4, wherein the platform defines a recessed collar; the encapsulation mold engaging the recessed collar.

6. The patch of claim 4, wherein the platform defines a hollow portion; the encapsulation material disposed in the hollow portion of the platform.

7. The patch of claim 4, further comprising an antenna substantially surrounded by the encapsulation material; the antenna being connected to the monitoring package.

8. The patch of claim 4, further comprising an antenna carried by the patch; the antenna being electrically connected to the monitoring package.

* * * * *